United States Patent
Jagdale et al.

(10) Patent No.: US 10,372,110 B2
(45) Date of Patent: Aug. 6, 2019

(54) CONTROLLED THIN WALL THICKNESS OF HEAT EXCHANGERS THROUGH MODELING OF ADDITIVE MANUFACTURING PROCESS

(71) Applicant: Hamilton Sundstrand Corporation, Charlotte, NC (US)

(72) Inventors: Vijay Jagdale, Manchester, CT (US); Ranadip Acharya, Rocky Hill, CT (US); Tahany Ibrahim El-Wardany, Bloomfield, CT (US); Colette O. Fennessy, West Hartford, CT (US); Sergey Mironets, Charlotte, NC (US); Diana Giulietti, Tariffville, CT (US); Kiley James Versluys, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 440 days.

(21) Appl. No.: 15/185,262

(22) Filed: Jun. 17, 2016

(65) Prior Publication Data
US 2017/0364058 A1     Dec. 21, 2017

(51) Int. Cl.
  *G05B 19/4099*  (2006.01)
  *B33Y 10/00*  (2015.01)
  (Continued)

(52) U.S. Cl.
  CPC .......... *G05B 19/4099* (2013.01); *B33Y 10/00* (2014.12); *B33Y 50/02* (2014.12);
  (Continued)

(58) Field of Classification Search
  CPC ...... G05B 19/4099; B33Y 10/00; B33Y 50/02
  See application file for complete search history.

(56) References Cited

U.S. PATENT DOCUMENTS

| 7,586,061 B2 | 9/2009 | Hoebel et al. |
| 7,704,565 B2 | 4/2010 | Slaughter |

(Continued)

FOREIGN PATENT DOCUMENTS

EP      2871433 A1    5/2015

OTHER PUBLICATIONS

Pinkerton et al. "Modelling the geometry of a moving laser melt pool and deposition track via energy and mass balances", J. Phys. D: Appl. Phys. 37 (2004) 1885-1895 (Year: 2004).*

(Continued)

*Primary Examiner* — Thomas C Lee
*Assistant Examiner* — Michael Tang
(74) *Attorney, Agent, or Firm* — Kinney & Lange, P.A.

(57) ABSTRACT

A method of producing a heat exchanger includes designing the heat exchanger to include a wall with a target thickness. A model is created relating process parameters to geometry of a single track melt pool and relating the single track melt pool geometry to a heat exchanger wall thickness. At least one variable process parameter is defined. The model, heat exchanger wall target thickness, and variable process parameters are used to identify a set of process parameters to produce the heat exchanger wall target thickness. The melt pool geometry is predicted based on the model and process parameters. The heat exchanger wall target thickness is predicted based on the melt pool geometry. The process parameters that will produce the heat exchanger wall target thickness are identified. The additive manufacturing process is controlled based upon the identified set of process parameters to create the heat exchanger wall target thickness.

10 Claims, 7 Drawing Sheets

(51) Int. Cl.
  *B33Y 50/02* (2015.01)
  *B23K 101/14* (2006.01)
  *B23P 15/26* (2006.01)
(52) U.S. Cl.
  CPC ........... *B23K 2101/14* (2018.08); *B23P 15/26* (2013.01); *G05B 2219/32359* (2013.01); *G05B 2219/49023* (2013.01); *G06F 2217/12* (2013.01)

(56) References Cited

U.S. PATENT DOCUMENTS

| | | |
|---|---|---|
| 7,777,155 B2 | 8/2010 | Twelves, Jr. et al. |
| 9,044,827 B2 | 6/2015 | Song et al. |
| 2004/0021256 A1* | 2/2004 | DeGrange et al. ..... B29C 35/08 264/497 |
| 2010/0174392 A1* | 7/2010 | Fink et al. ............... G06G 7/66 700/104 |
| 2014/0163717 A1 | 6/2014 | Das et al. |
| 2015/0190971 A1 | 7/2015 | Musuvathy et al. |
| 2015/0310148 A1 | 10/2015 | Lacaze et al. |
| 2016/0046076 A1 | 2/2016 | Huang et al. |
| 2016/0108814 A1 | 4/2016 | Schmitz |
| 2016/0114439 A1 | 4/2016 | Pal et al. |

OTHER PUBLICATIONS

Wong et al. "Convective Heat Transfer and Pressure Losses Across Novel Heat Sinks Fabricated by Selective Laser Melting", International Journal of Heat and Mass Transfer 52 (2009) 281-288 (Year: 2009).*

Mehrabi et al. "Anisotropic behavior of superelastic NiTi shape memory alloys; an experimental investigation and constitutive modeling", Mechanics of Materials 77 (2014) 110-124 (Year: 2014).*

Khairallah et al. "Mesoscopic simulation model of selective laser melting of stainless steel powder", Journal of Materials Processing Technology 214 (2014) 2627-2636 (Year: 2014).*

Acharya et al. "Additive Manufacturing of IN100 Superalloy Through Scanning Laser Epitaxy for Turbine Engine Hot-Section Component Repair: Process Development, Modeling,", Metallurgical and Materials Transactions A, vol. 46A, Sep. 2015, p. 3864-p. 3875 (Year: 2015).*

Criales et al. ("A Sensitivity Analysis Study on the Material Properties and Process Parameters for Selective Laser Melting of Inconel 625", Proceedings of MSEC2015, 2015 ASME International Conference on Manufacturing Science and Engineering, Jun. 8-12, 2015 (Year: 2015).*

Kim et al., "A numerical analysis of heat and fluid flow with a deformable curved free surface in a laser melting process", International Journal of Heat and Fluid Flow 29 (2008), p. 1481-1493 (Year: 2008).*

* cited by examiner

CONTROLLED THIN WALL THICKNESS OF HEAT EXCHANGERS THROUGH MODELING OF ADDITIVE MANUFACTURING PROCESS

BACKGROUND

The present disclosure relates generally to additive manufacturing, and more particularly to additive manufacturing of heat exchangers.

Additive manufacturing is an established but growing technology that includes layer-wise construction of articles from thin layers of feed material. Additive manufacturing can involve applying liquid, solid, or particulate material to a workstage, then curing, melting, and/or sintering, etc. to create a layer. The process is repeated up to several thousand times or more to construct the desired finished component or article.

The use of additive manufacturing to produce heat exchangers, powder bed fusion additive manufacturing process in particular using including but not limited to laser or electron beam as energy source, can create fin and other part feature wall thicknesses that are larger than desired for required spatial and thermodynamic characteristics of the heat exchanger for a given application. The resulting walls can have inconsistent thicknesses, brittle or weak structures, and inefficient thermo-dynamic characteristics. Extensive experimental trial and error can be required to identify optimum process parameters in order to produce a heat exchanger wall with a desired thickness.

SUMMARY

A method of producing a heat exchanger using a powder bed fusion additive manufacturing process includes designing the heat exchanger to include a wall with a target thickness of desirably less than 0.005 inches (0.013 centimeters). A virtual simulation model is created that relates process parameters of the powder bed fusion additive manufacturing process to geometry of a single track melt pool created during the powder bed fusion additive manufacturing process and that relates the single track melt pool geometry to a resulting thickness of the heat exchanger wall. The model includes at least one of analytical modeling, empirical modeling, finite element modeling, computational fluid dynamics based single phase flow modeling, and computational fluid dynamics based free surface modeling. At least one variable process parameter of the powder bed fusion additive manufacturing process is defined as one of beam energy level, beam scanning speed, beam scanning pattern, and layer thickness of the powder. The model, the target thickness of the heat exchanger wall, and the at least one variable process parameter are used to identify a set of process parameters to produce the heat exchanger wall with the target thickness. The single track melt pool geometry is predicted based on the model and process parameters that include at least one variable process parameter. The thickness of the heat exchanger wall is predicted based on the single track melt pool geometry. The set of process parameters that will produce the heat exchanger wall with the target thickness are identified by adjusting at least one variable process parameter. The powder bed fusion additive manufacturing process is controlled based upon the identified set of process parameters to create, on a layer-by-layer basis, the heat exchanger wall with the target thickness.

A method of additively manufacturing a heat exchanger that includes a heat exchanger wall with a target thickness of desirably less than 0.005 inches (0.013 centimeters) includes using a model, the target thickness of the heat exchanger wall, and process parameters of a powder bed fusion additive manufacturing process to identify a set of process parameters to produce the heat exchanger wall with the target thickness. The model relates the process parameters of the powder bed fusion additive manufacturing process to geometry of a single track melt pool created during the powder bed fusion additive manufacturing process, and relates the single track melt pool geometry to a resulting thickness of the heat exchanger wall. The model includes at least one of analytical modeling, empirical modeling, finite element modeling, computational fluid dynamics based single phase flow modeling, and computational fluid dynamics based free surface modeling. At least one variable process parameter of the powder bed fusion additive manufacturing process is defined as one of beam energy level, beam scanning speed, beam scanning pattern, and layer thickness of the powder. The single track melt pool geometry is predicted based on the model and process parameters that include at least one variable process parameter. The thickness of the heat exchanger wall is predicted based on the single track melt pool geometry. The set of process parameters that will produce the heat exchanger wall with the target thickness are identified by adjusting at least one variable process parameter. The powder bed fusion additive manufacturing process is controlled based upon the identified set of process parameters to create, on a layer-by-layer basis, the heat exchanger wall with the target thickness.

DETAILED DESCRIPTION

Figure 1A:
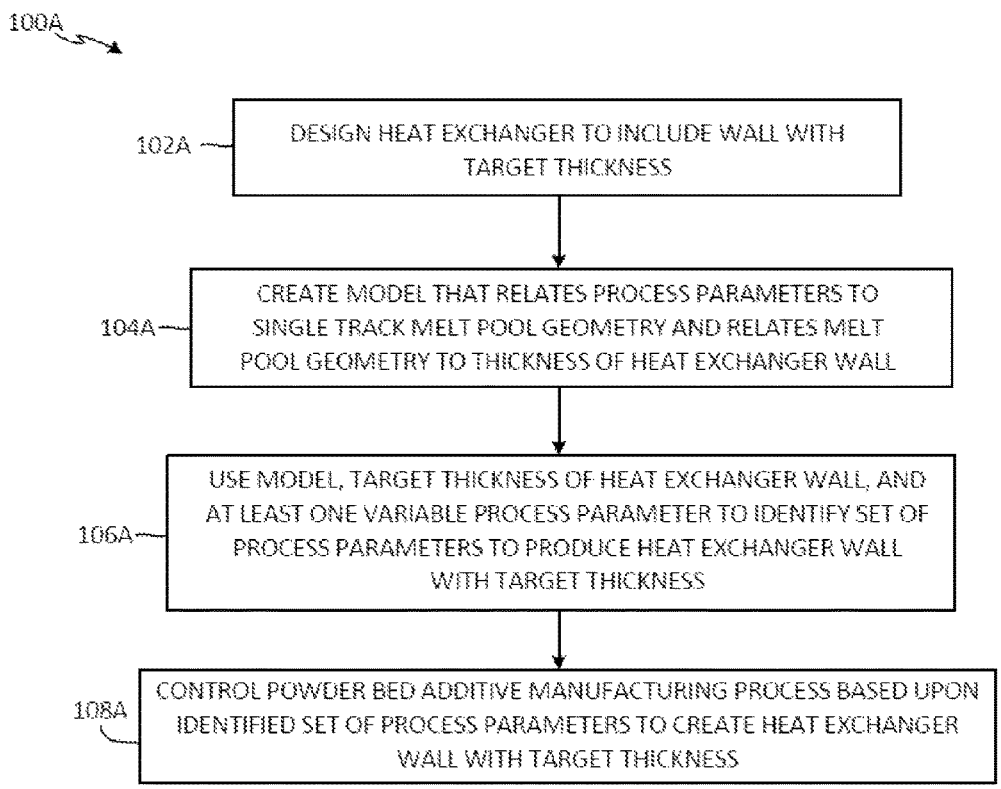
FIG. 1A is a flowchart of a method of producing a heat exchanger using a powder bed fusion additive manufacturing process.

Additive manufacturing processes include the ability to produce highly complex parts quickly and efficiently, and to modify design specifications of the desired part, for example by modifying CAD specifications, without re-tooling casting or machining equipment used for traditional, subtractive manufacturing processes. Additive manufacturing allows complex design features to be incorporated into parts where those complex design features had proved infeasible using previous manufacturing techniques.

For example, a three-dimensional digital model an article is typically created. Then, the digital model is converted into a computer file, or computer aided design ("CAD") data, defining the article in layers. The CAD data can relate to a particular cross-section of the article. For example, the CAD data can include geometric data relating to a size, shape, thickness, material, mass, or density of the article, as well as internal features, passages, and structures. Next, a layer of powder material is deposited on a work platform. A heat source, such as a laser or electron beam, then selectively melts, sinters, or fuses the metallic powder over the platform. Once cooled, the melted layer becomes the first layer. After the first layer is formed, the platform, along with the first layer, lowers and un-fused powder fills in the void over the first layer. That powder is then melted, sintered, or fused to form a second layer. The process of building the article a layer at a time is repeated until the complete component is manufactured. While a powder bed fusion additive manufacturing process is generally described, other additive manufacturing techniques can be employed, such as, for example, electron beam melting, electron beam powder bed, direct metal laser sintering, electron beam powder bed fusion, laser powder deposition, directed energy deposition, wire arc additive process, electron beam wire, and selective laser sintering, as well as other powder bed methods in general. Powder bed methods work well with metals as well as plastics, polymers, composites and ceramics.

In most additive manufacturing processes, the thereto-physical properties of the material, thermo-dynamic characteristics of the material in a melted state (e.g., flow dynamics, thermal boundary conditions), and process parameters are some of the aspects of the additive manufacturing process which play a large role in the resulting geometric characteristics of the article. Specifically with regards to powder bed fusion, the resulting geometric characteristics of the article are strongly related to the thermo-dynamic characteristics of a melt pool created during the additive manufacturing process.

The thereto-dynamic characteristics of the melt pool can include cooling rate, fluid dynamics, conduction, natural convection, thermo-capillary convection, boundary convection, melting and re-solidification, radiation, and conjugate heat transfer. The thermo-dynamic characteristics of the melt pool result as a function of both the thermo-physical properties of the material (in both powdered and solid substrate form) and the process parameters of the additive manufacturing process. The thermo-physical properties of the material include temperature dependent properties and phase change behavior of the material. Specific examples of the thermo-physical properties of the material can include, melt temperature, conductivity, material solidus (temperature at which a material completely solidifies), liquidus temperature (temperature above which a material is completely liquid), latent heat of melting, temperature dependent density, specific heat, viscosity, and surface tension.

The thermo-dynamic characteristics of the melt pool also result as a function of the process parameters of the additive manufacturing process. The process parameters of the additive manufacturing process can generally include energy input control, hatch spacing, scanning strategy, machine settings, and physical characteristics of the material. More specifically, the process parameters of the additive manufacturing process can include energy type, energy density, beam energy level, beam spot size, beam wavelength, beam tilt, beam scanning pattern, beam scanning speed, beam power distribution, type of the material, powder layer thickness, compaction density of material powder, powder particle size distribution, as well as hatch spacing and arrangement of a powder re-coater of an additive manufacturing machine used for the powder bed fusion additive manufacturing process. Three of the preceding process parameters which have a strong effect on the resulting geometry of the article in a powder bed fusion additive manufacturing process include beam energy level, beam scanning speed, beam scanning pattern, and a layer thickness of the powder.

As applied to the manufacture of heat exchangers, powder bed fusion additive manufacturing allows for customizable thicknesses and conformal geometries within a heat exchanger. Heat exchangers require particular geometries for specific thermo-dynamic characteristics based on how the heat exchanger is being used. In general, the elements that transfer thermal energy from the heat exchanger to an external environment, such as a heat exchanger wall, function best when the surface area of the heat exchanger wall is maximized. One way of maximizing the surface area of the heat exchanger wall is through minimizing the thickness of heat exchanger wall. Additive manufacturing allows for the creation of minimal wall thicknesses, for example less than 0.005 inches (0.013 centimeters), and conformal shapes such as perforated, serrated, or herringbone configurations, which are either very difficult or not possible to produce using conventional methods involving welding and brazing of thin sheet metals.

Conventional heat exchangers are typically constructed out of flat sheet metal and can include dividing plates, spacing bars, and two-dimensional thin corrugated fins brazed together. The fabrication process is relatively simple, but the manufacturing simplicity can have a negative impact on the performance of the heat exchanger (i.e., how well the heat exchanger cools a high-temperature fluid). Conventional heat exchangers often include a two dimensional geometry with large thicknesses for heat exchanger walls, which has an impact on flow distribution and pressure drop. In addition, the integrity of the heat exchanger structure is limited by the strength and quality of the braze joints which may be subject to stress concentration. Conventional heat exchangers often do not specifically account for pressure drop through the heat exchanger or the thermal gradient stresses caused by the differences in temperature between the heat exchanger walls.

FIG. 1A is a flowchart of method 100A of producing a heat exchanger using a powder bed fusion additive manufacturing process. Method 100A includes steps 102A-108A. Step 102A includes designing the heat exchanger to include a wall with a target thickness of desirably less than 0.005 inches (0.013 centimeters). In one non-limiting embodiment, the target thickness of the heat exchanger wall can include a thickness of equal to or less than 0.004 inches (0.010 centimeters). In another non-limiting embodiment, instead of the thickness of the heat exchanger wall, a target output could alternatively include a mass, volume, surface area, or geometry on the heat exchanger or the heat exchanger wall. Step 104A includes creating a virtual simulation model that relates process parameters of the additive manufacturing process to geometry of a single track melt pool created during the powder bed fusion additive manufacturing process and relates single track melt pool geometry to a resulting thickness of the heat exchanger wall. Step 106A includes using the model, the target thickness of the heat exchanger wall, and at least one variable process parameter to identify a set of process parameters to produce the heat exchanger wall with the target thickness. Step 108A includes controlling the powder bed fusion additive manufacturing process based upon the identified set of process parameters to create, on a layer-by-layer basis, the heat exchanger wall with the target thickness.

Figure 1B:
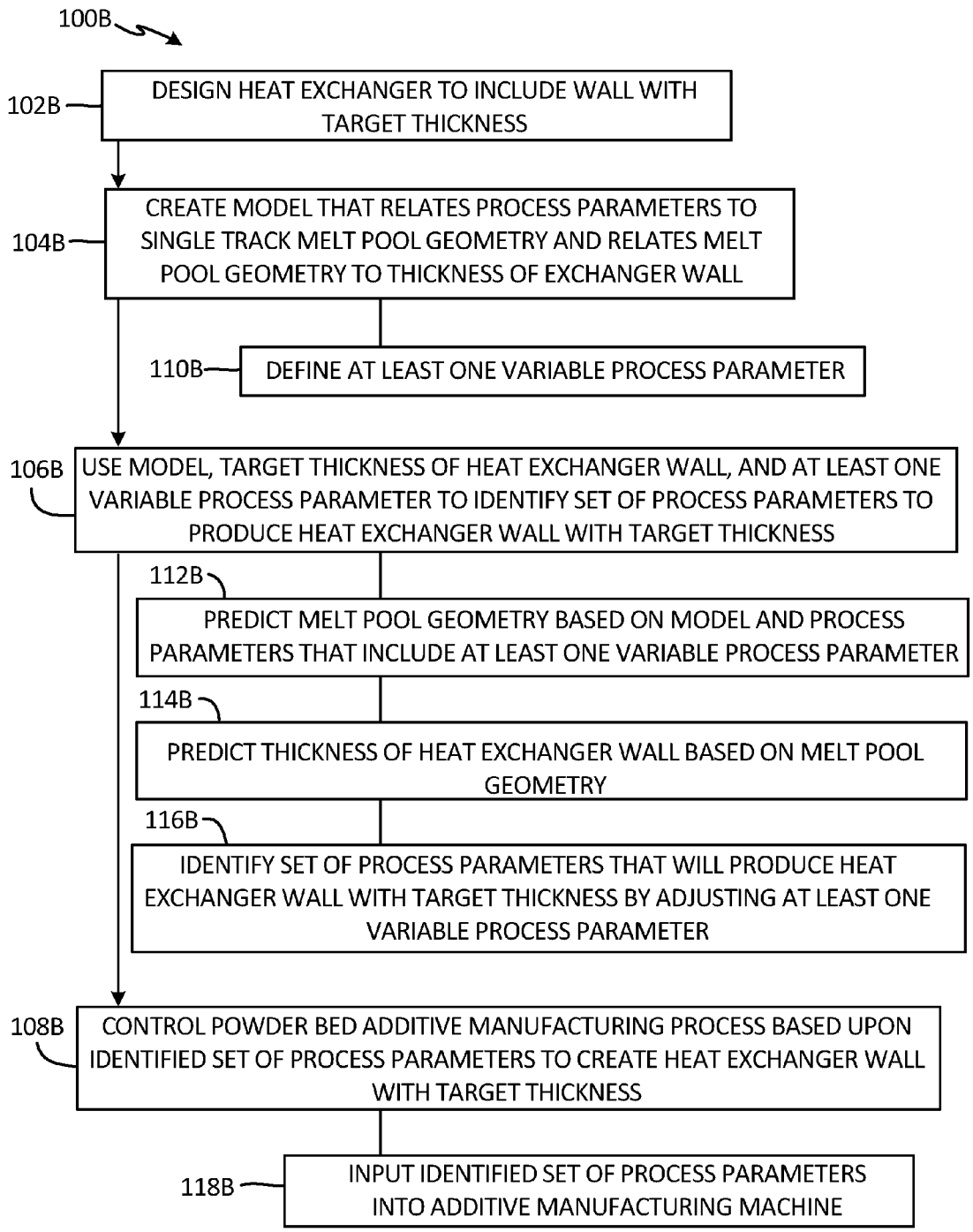
FIG. 1B is a more detailed flowchart of the method of producing a heat exchanger using a powder bed fusion additive manufacturing process.

FIG. 1B is a flowchart of method 100A of FIG. 1A shown in more detail. Method 100B includes steps 102B-118B. Steps 102B-108B of method 100B shown in FIG. 1B include the same steps as steps 102A-108A of method 100A shown in FIG. 1A.

Step 110B includes defining at least one variable process parameter of the powder bed fusion additive manufacturing process, such as beam energy level, beam scanning speed, beam scanning pattern, or a layer thickness of the powder. Step 110B can also include applying an analysis to experimental results of the powder bed fusion additive manufacturing process to calibrate the model. The analysis can include at least one of finite element analysis, empirical analysis, stress analysis, regression analysis, sensitivity analysis, calibration of boundary convection coefficients of the melt pool created during the additive manufacturing process based on the model, predicting a thermo-capillary convection of the melt pool, and computation of deformation of the melt pool. Step 110B can also include creating the model based on results of the analysis of the experimental results. The model can provide a relationship between the process parameters of the powder bed fusion additive manufacturing process, thereto-dynamic and geometric characteristics of the single track melt pool, and thermo-physical properties of a material used in the of the powder bed fusion additive manufacturing process. The process parameters of the powder bed fusion additive manufacturing process can include at least one of energy type, energy density, beam energy level, beam spot size, beam wavelength, beam tilt, beam scanning pattern, beam scanning speed, beam power distribution, type of the material, powder layer thickness, compaction density of material powder, powder particle size distribution, hatch spacing of an additive manufacturing machine used for the powder bed fusion additive manufacturing process, and an arrangement of a powder re-coater of the additive manufacturing machine.

Step 112B includes predicting the single track melt pool geometry based on the model and process parameters that include the at least one variable process parameter. Step 114B includes predicting the thickness of the heat exchanger wall based on the single track melt pool geometry. Step 116B includes identifying the set of process parameters that will produce the heat exchanger wall with the target thickness by adjusting the at least one variable process parameter. Step 118B includes inputting the identified set of process parameters into an additive manufacturing machine used for the powder bed fusion additive manufacturing process.

In one non-limiting embodiment, method 100B includes the development of laser powder bed fusion process models for model-driven process parameter selection and optimization. Method 100B can utilize finite element modeling of a melt pool created during a laser deposition process, to optimize the deposition process parameters in order to control the resulting thickness of the heat exchanger wall. Additionally, a computational fluid dynamics model can be developed and applied in order to model the melt pool. Fluid dynamics modeling of the melt pool can include conduction, natural convection, and thermo-capillary convection conditions which affect the melt pool shape, geometry, and the accuracy of predicting the melt pool width and consequently the thickness of the heat exchanger wall.

Figure 2:
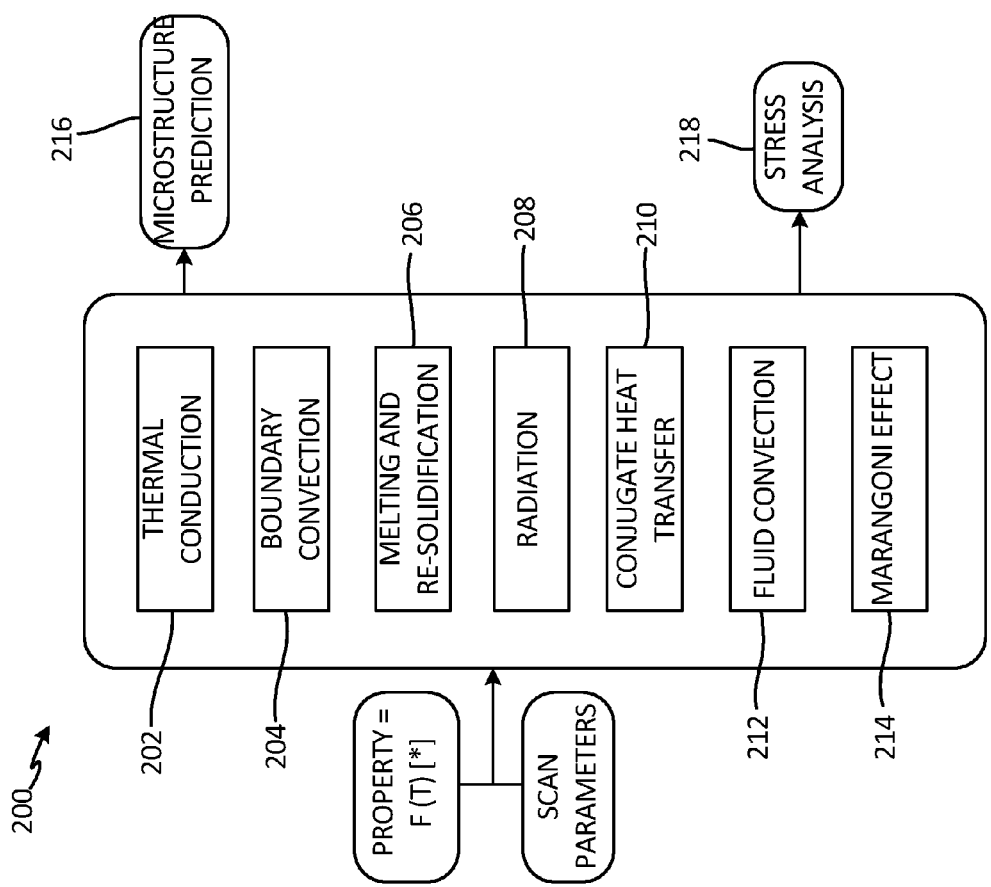
FIG. 2 is a flowchart of a set of some of the thermodynamic characteristics and considerations of a melt pool modeling physics during the powder bed fusion additive manufacturing process of FIGS. 1 and 1B.

FIG. 2 is a flowchart of list 200 of thermo-dynamic characteristics of the melt pool created during the powder bed fusion additive manufacturing process of methods 100A and 100B upon which fluid dynamics modeling can be based. List 200 includes thermal conduction 202, boundary convection 204, melting and re-solidification 206, radiation 208, conjugate heat transfer 210, fluid convection 212 and Marangoni effect 214 (also known as thermo-capillary convection) of the melt pool. Each of thermal conduction 202, boundary convection 204, melting and re-solidification 206, radiation 208, conjugate heat transfer 210, fluid convection 212 and Marangoni effect 214 can be input into the model of methods 100A and 100B to create microstructure prediction 216 and stress analysis 218 of the resulting heat exchanger and heat exchanger wall, as desired.

Example types of models can include the use of various equations and algorithms to model, describe, and predict the behavior of the melt pool. Examples of equations which can be used in modeling the melt pool can include momentum equations with sink (e.g., Darcy's Law), turbulence eddy viscosity models, surface tension variation equations, approximations for density (e.g., Boussinesq approximation), and equations to calculate the pressure drop of a fluid flowing through a packed bed of solids (e.g., Kozeny-Carman equation).

A developed model can be extended to predict the free form surface of the melt pool (in three dimensions) in order to be able to predict the change of the heat exchanger wall thickness as a function of the process parameters of the additive manufacturing process, as well as other variables such as deposition strategy, multiple layers deposition, residual stress, and distortion. Analyses can then be performed to identify the optimum process parameters to produce a desired, or target, thickness of the heat exchanger wall. Examples of analysis can include finite element analysis, empirical analysis, stress analysis, regression analysis, sensitivity analysis, calibration of boundary convection coefficients of a melt pool created during the additive manufacturing process based on the model, predicting a thermo-capillary convection of the melt pool, and computation of deformation of the melt pool.

In addition to the thermo-dynamic characteristics and flow dynamics of the melt pool formed during an additive manufacturing process, other characteristics of the additive manufacturing materials and process can be used as inputs with which to create models for predicting changes to the heat exchanger wall thickness. Modeling inputs can also include heat flux model(s) of the energy source as well as thermo-physical properties and thermal boundary conditions of the powder and substrate material. An example of a heat flux model can include process parameters such as beam power distribution, powder layer thickness, packing density of material powder, powder particle size distribution, powder layer thickness, and arrangement of a powder re-coater, as well as material and powder layer behavior such as a laser absorption coefficient and an optical penetration depth. Example thermo-physical properties of the material can include material solidus (temperature at which a material completely solidifies), liquidus temperature (temperature above which a material is completely liquid), latent heat of melting, temperature dependent density, thermal conductivity, specific heat, viscosity, and surface tension. Example thermal boundary conditions of the powder and substrate material can include convection coefficients on the powder surface, convection and conduction through the substrate (already solidified part/article/wall), radiation (material emissivity) to an ambient environment, and an ambient temperature of the additive manufacturing machine.

Additionally, methods 100A and 100B can incorporate the following for modeling heat exchanger wall thickness: accommodation of different scan strategies and heat flux model for tilting of the laser beam relative to a build platform used in the additive manufacturing process, calibration of boundary convection coefficients to accommodate change of environment, inclusion of fluid convection and Marangoni effect (thermo-capillary convection) to capture the vortices in the melt pool and subsequent shallowing of melt pool due to surface tension gradient, computation of stress/deformation generated due to laser processing, free surface model with phase change to capture the solid-liquid interface, and a Hagen-Rubens relationship for absorptance computation (e.g., the fraction of incident electromagnetic power that is absorbed at an interface).

Due to the complexity and the large number of variables and parameters that go into additively manufacturing a thin wall, as well as modeling the dynamic behavior of a melt pool of an additive manufacturing process, the methods of the current disclosure can reduce the time of bringing an additively manufactured heat exchanger to market by eliminating the need for trial and error to define the process parameters for specific desired or target geometries of the heat exchanger wall. The discussed use of modeling can also prevent defects in the resulting heat exchanger walls by identifying inputs and variables that would produce heat exchanger walls with undesirable characteristics such as structural inconsistencies or variations in thickness or thermodynamic performance of the formed wall. The above methods allow for minimizing heat exchanger wall thickness, which increases the heat transfer surface area in the heat exchanger, which increases the overall thermal transfer efficiency of the heat exchanger. The above methods also minimize thermal energy transfer issues of the heat exchanger and increase the thermo-dynamic predictability of heat exchanger through the creation of heat exchanger walls with consistent and predictable wall thicknesses.

Figure 3:
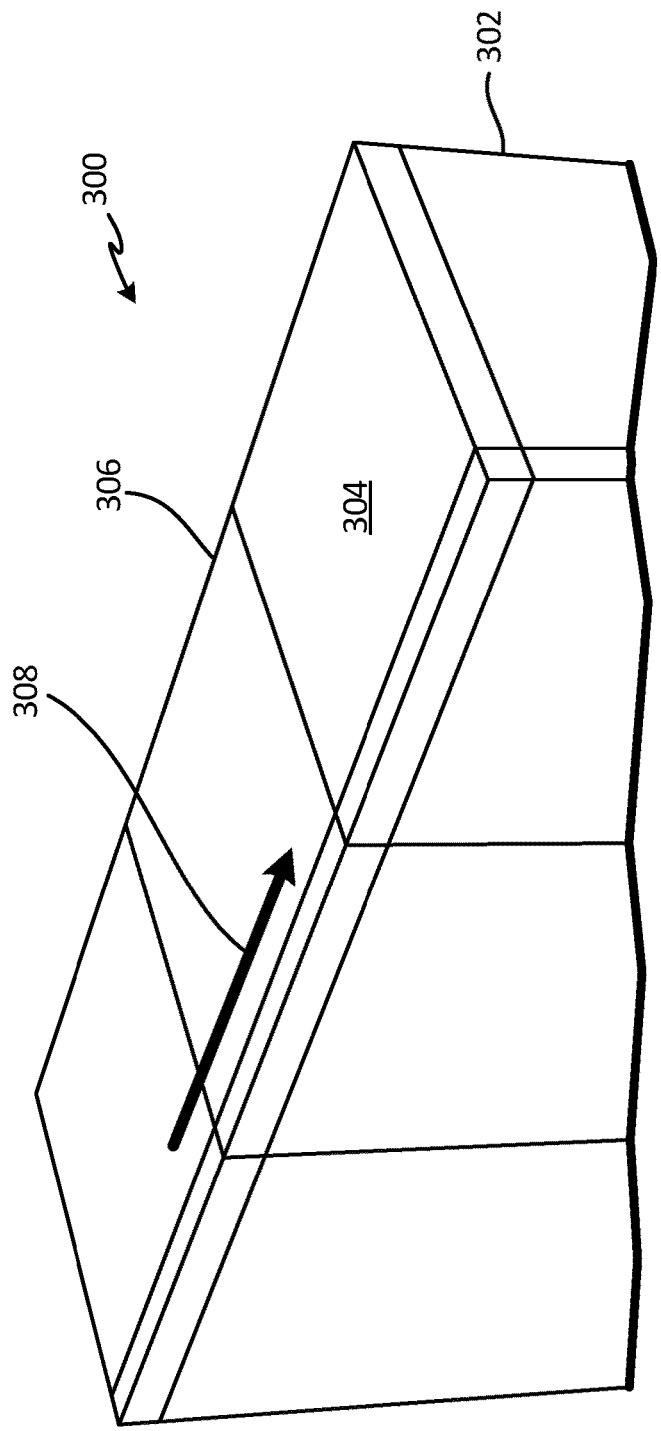
FIG. 3 is an example partial perspective view of material used in an additive manufacturing process for modeling purposes.

FIG. 3 is an example partial perspective cross-sectional view of a model of material 300 used in an additive manufacturing process. Material 300 includes substrate 302 and powder layer 304 positioned on top 306 of material 300. Substrate 302 represents baseplate material or solidified material 300 resulting from previous layer formation during an additive manufacturing process. Powder layer 304 is resting on top 306 of material 300 in preparation for a next step in the additive manufacturing process which includes melting a portion of powder layer 304 with an energy beam such as a laser. Deposition direction 308 includes a direction the energy beam will pass over material 300 during a melting step of the additive manufacturing process. As the laser beam is scanned across material 300, a new layer of material 300 is melted, solidified, and added to substrate 302, and an article is built layer-by-layer as each new layer becomes solidified.

Figure 4A:
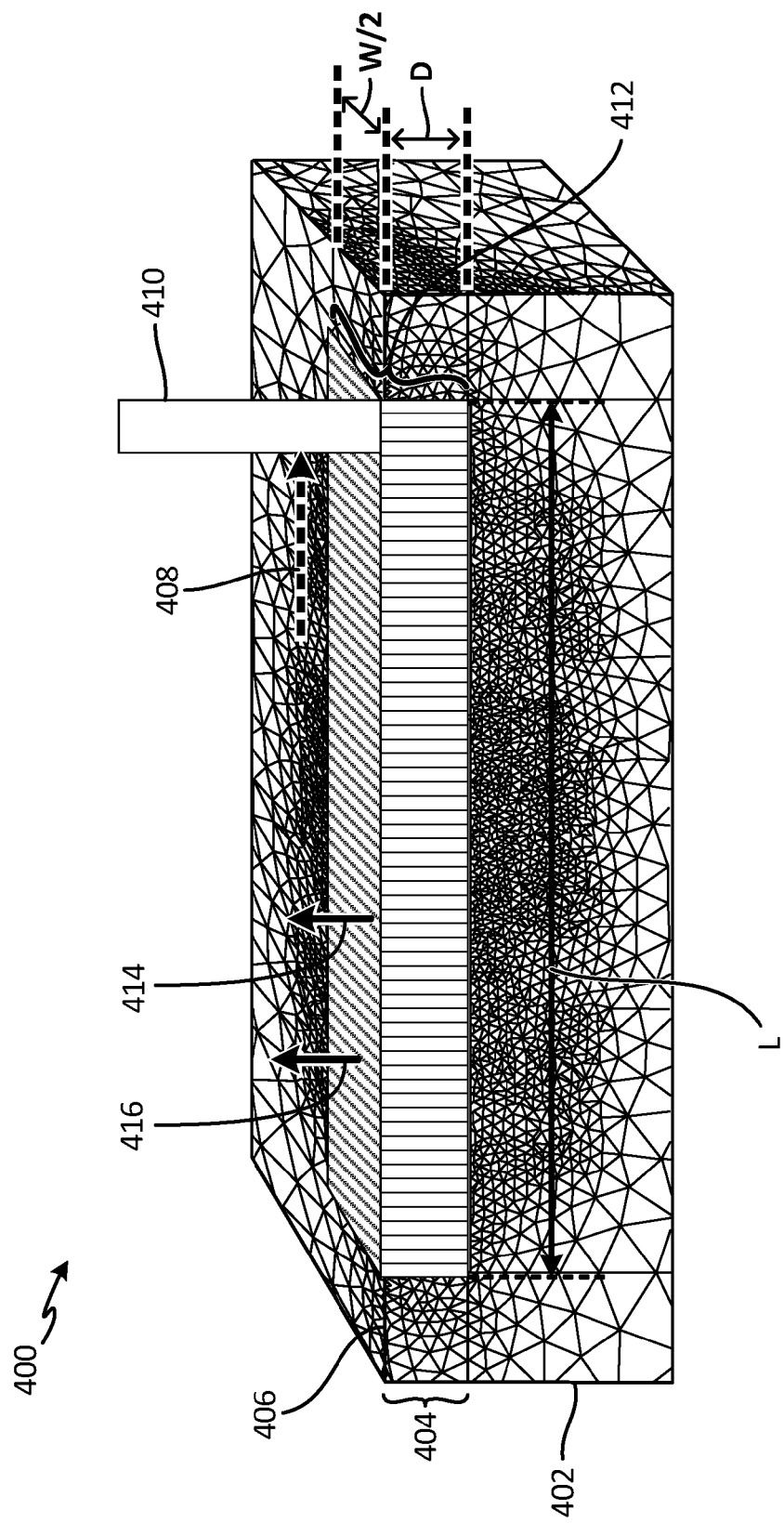
FIG. 4A is an example side view of an energy beam and material used in an additive manufacturing process for modeling purposes.

FIG. 4A is an example perspective cross-sectional view of a model showing energy beam 410 and material 400 used in an additive manufacturing process. Material 400 includes substrate 402 and powder layer 404 positioned on top 406 of material 400. Substrate 402 represents baseplate material or solidified material 400 resulting from previous layer formation during an additive manufacturing process. Powder layer 404 is resting on top 406 of material 400. Deposition direction 408 includes a direction that energy beam 410 passes over material 400 in order to melt powder layer 404 during a melting step of the additive manufacturing process.

As energy beam 410 is scanned across powder layer 404, melt pool 412 forms on top 406 of material 400. Due to an amount of thermal energy absorbed into melt pool 412 from energy beam 410, thermal energy is released from melt pool in the form of convection 414 and radiation 416. As melt pool 412 cools, a new layer of solidified material becomes added to substrate 402, and an article is built layer-by-layer as each new layer becomes solidified.

Melt pool 412 includes half-width W/2, depth D, and length L. Half-width W/2 depth D, and length L of melt pool 412 created during an additive manufacturing process correspond to a resulting thickness of a finally formed article, such as a wall of a heat exchanger. Values of half-width W/2, depth D, and length L of melt pool 412 are determined primarily by an energy level of energy beam 410, a scanning speed of energy beam 410 (e.g., how fast energy beam 410 is drawn across material 400), and a thickness of powder layer 404. Other variables or parameters that can be adjusted to vary half-width W/2, depth D, and length L of melt pool 412 can include the type of energy of energy beam 410, density of energy beam 410, power of energy beam 410, spot size of energy beam 410, wavelength of energy beam 410, tilt of energy beam 410, scanning pattern of energy beam 410, type of material 400, specific heat of material 400, melt temperature of material 400, conductivity of material 400, powder size of powder layer 404, particle size distribution of powder layer 404, compaction density of powder layer 404, cooling rate of material 400, fluid dynamics of material 400 in a melted state, fluid convection rate of material 400 in the melted state, hatch spacing of an additive manufacturing machine used for the additive manufacturing process, and machine settings of the additive manufacturing machine among others.

Figure 4B:
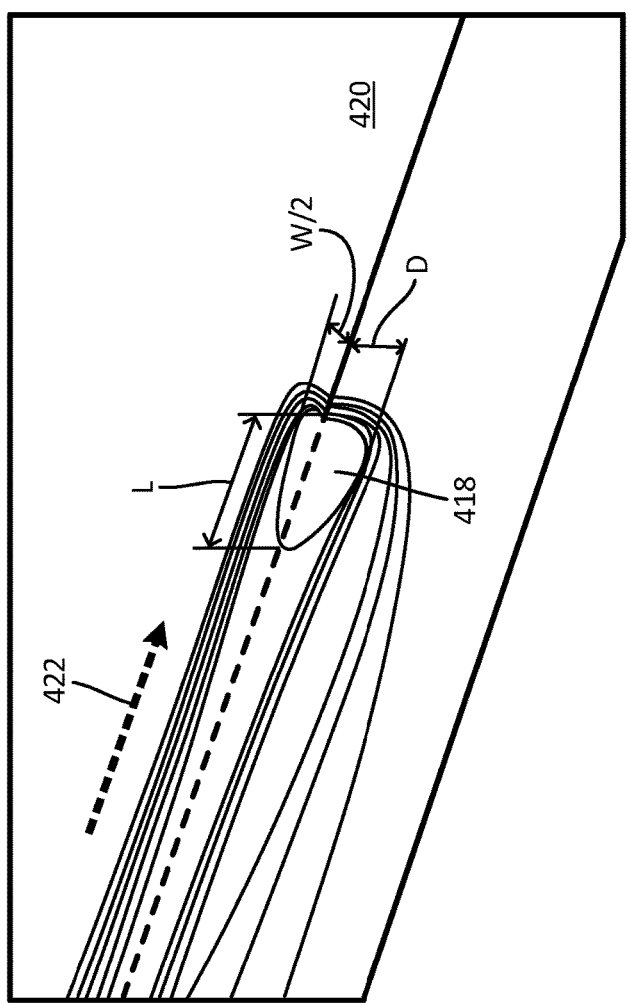
FIG. 4B is a perspective view of an example modelling output for an additive manufacturing process.

FIG. 4B is a perspective view of an example modelling output for an additive manufacturing process, the modelling output showing melt pool 418 created in powder layer 420 during an additive manufacturing process. Deposition direction 422 includes a direction that an energy beam, for example energy beam 410, passes over powder layer 420 in order to melt powder layer 420 during a melting step of the additive manufacturing process. As the energy beam is scanned across powder layer 420, melt pool 418 forms on top of powder layer 420.

Melt pool 418 includes half-width W/2, depth D, and length L. Half-width W/2 depth D, and length L of melt pool 418 created during an additive manufacturing process correspond to a resulting thickness of a finally formed article, such as a wall of a heat exchanger. Values of half-width W/2, depth D, and length L of melt pool 418 are determined primarily by an energy level of the energy beam, a scanning speed of the energy beam (e.g., how fast the energy beam is drawn across powder layer 420), and a thickness of powder layer 420. Other variables or parameters that can be adjusted to vary half-width W/2, depth D, and length L of melt pool 418 can include the type of energy of the energy beam, density of the energy beam, power of the energy beam, spot size of the energy beam, wavelength of the energy beam, tilt of the energy beam, scanning pattern of the energy beam, type of the material, specific heat of the material, melt temperature of the material, conductivity of the material, powder size of powder layer 420, particle size distribution of powder layer 420, compaction density of powder layer 420, cooling rate of the material, fluid dynamics of the material in a melted state, fluid convection rate of the material in the melted state, hatch spacing of an additive manufacturing machine used for the additive manufacturing process, and machine settings of the additive manufacturing machine among others.

Figure 5A:
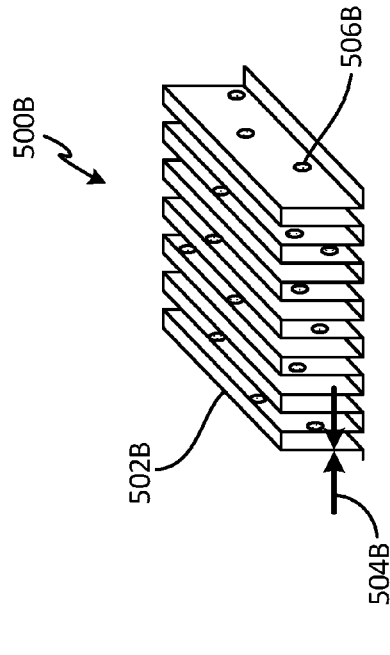
FIG. 5A is a perspective view of an example heat exchanger wall.

FIG. 5A is a perspective view of an example heat exchanger 500A with wall 502A. A shape of wall 502A includes a stepped linear geometry. Wall 502A includes thickness 504A which can be desirably equal to or less than 0.004 inches (0.010 centimeters). FIG. 5A also shows build direction A and build direction B. Heat exchanger 500A can be built using an additive manufacturing process using either build direction A, build direction B, or other possible directions that help minimize wall thickness based on model predictions. Specifically, a powder bed fusion type of additive manufacturing allows for wall 502A of heat exchanger 500A to be built in a vertical plane, such as depicted by build direction A, or by an angled build direction, such as depicted by build direction B. Heat exchanger 500A can be built using an additive manufacturing process such as the methods discussed in FIGS. 1A, 1B, and 2.

Figure 5B:
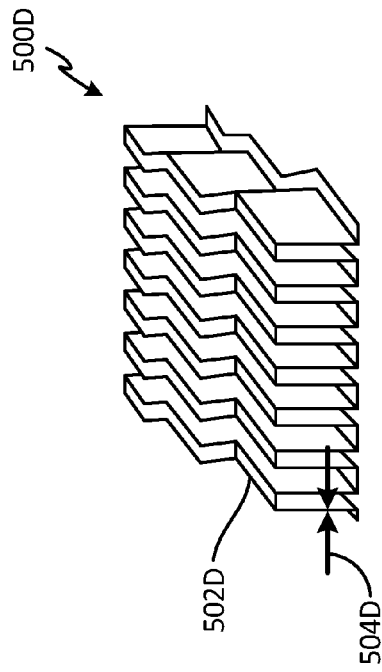
FIG. 5B is a perspective view of another example heat exchanger wall.

FIG. 5B is a perspective view of an example heat exchanger 500B with wall 502B. A shape of wall 502B includes a stepped linear geometry with perforations 506B. Perforations 506B allow for additional fluid flow through and across heat exchanger 500B by providing passage for fluid to pass through wall 502B. Wall 502B includes thickness 504B which can be desirably equal to or less than 0.004 inches (0.010 centimeters). Heat exchanger 500B can be built using an additive manufacturing process such as the methods discussed in FIGS. 1A, 1B, and 2.

Figure 5C:
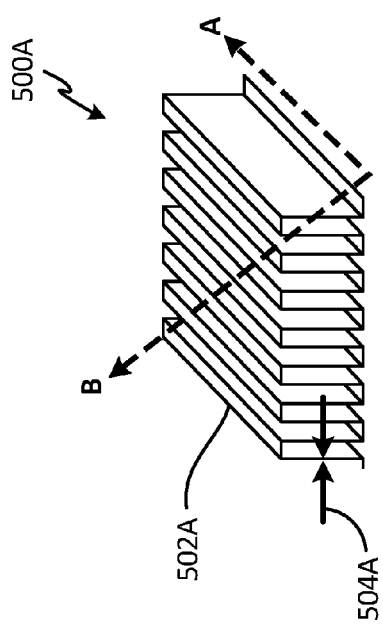
FIG. 5C is a perspective view of yet another example heat exchanger wall.

FIG. 5C is a perspective view of an example heat exchanger 500C with wall 502C. A shape of wall 502C includes a serrated geometry. The serrated geometry on wall 502C allows for increased thermal transfer from heat exchanger 500C to a passing fluid by increasing the surface area of wall 502C and by creating turbulence as fluid passes across the serrated geometry on wall 502C. Wall 502C includes thickness 504C which can be desirably equal to or less than 0.004 inches (0.010 centimeters). Heat exchanger 500C can be built using an additive manufacturing process such as the methods discussed in FIGS. 1A, 1B, and 2.

Figure 5D:
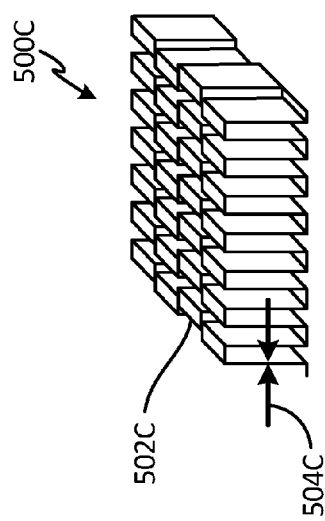
FIG. 5D is a perspective view of yet another example heat exchanger wall.

FIG. 5D is a perspective view of an example heat exchanger 500D with wall 502D. A shape of wall 502D includes a herringbone geometry. The herringbone geometry on wall 502D allows for additional fluid flow through and across heat exchanger 500D by disrupting a linear fluid flow and creating turbulence as fluid passes across the herringbone geometry on wall 502D. Wall 502D includes thickness 504D which can be desirably equal to or less than 0.004 inches (0.010 centimeters). Heat exchanger 500D can be built using an additive manufacturing process such as the methods discussed in FIGS. 1A, 1B, and 2.

Heat exchangers 500A, 500B, 500C, and 500D can be constructed from a variety of materials, including plastic, metal, an alloy, or another material. However, manufacturing heat exchangers 500A, 500B, 500C, and 500D from a thermally conductive material may be beneficial to promote the transfer of thermal energy. In one non-limiting embodiment, the exchangers 500A, 500B. 500C, and 500D are constructed from a nickel-based alloy.

Walls 502A, 502B, 502C, and 502D of heat exchangers 500A, 500B, 500C, and 500D respectively can be built by methods 100A, 100B, or 200 discussed above with respect to FIGS. 1A, 1B, and 2 which include the development of laser powder bed fusion process models for model-driven process parameter selection and optimization, in this case minimization, of thicknesses 504A, 504B, 504C, and 504D.

Discussion of Possible Embodiments

The following are non-exclusive descriptions of possible embodiments of the present invention.

A method of producing a heat exchanger using a powder bed fusion additive manufacturing process can include designing the heat exchanger to include a wall with a target thickness of desirably less than 0.005 inches (0.013 centimeters). A model can be created that can relate process parameters of the powder bed fusion additive manufacturing process to geometry of a single track melt pool created during the powder bed fusion additive manufacturing process, and that can relate the single track melt pool geometry to a resulting thickness of the heat exchanger wall. The model can include at least one of analytical modeling, empirical modeling, finite element modeling, computational fluid dynamics based single phase flow modeling, and/or computational fluid dynamics based free surface modeling. At least one variable process parameter of the powder bed fusion additive manufacturing process can be defined as, including but not limited to, one of beam energy level, beam scanning speed, beam scanning pattern, and/or a layer thickness of the powder. The model, the target thickness of the heat exchanger wall, and/or the at least one variable process parameter can be used to identify a set of process parameters to produce the heat exchanger wall with the target thickness. The single track melt pool geometry can be predicted based on the model and/or process parameters that include at least one variable process parameter. The thickness of the heat exchanger wall can be predicted based on the single track melt pool geometry. The set of process parameters that can produce the heat exchanger wall with the target thickness can be identified by adjusting at least one variable process parameter. The powder bed fusion additive manufacturing process can be controlled based upon the identified set of process parameters to create, on a layer-by-layer basis, the heat exchanger wall with the target thickness.

The method of the preceding paragraph can optionally include, additionally and/or alternatively, any one or more of the following features, configurations and/or additional components.

Controlling the powder bed fusion additive manufacturing process can further comprise inputting the identified set of process parameters into an additive manufacturing machine used for the powder bed fusion additive manufacturing process.

The geometry of the single track melt pool can include at least one of a width, depth, and length of the single track melt pool.

An analysis can be applied to experimental results of the powder bed fusion additive manufacturing process to calibrate the model.

The analysis can include at least one of finite element analysis, empirical analysis, stress analysis, regression analysis, sensitivity analysis, calibration of boundary convection coefficients of the melt pool created during the additive manufacturing process based on the model, predicting a thermo-capillary convection of the melt pool, and/or computation of deformation of the melt pool.

The model can be created based on results of the analysis of the experimental results, wherein the model can further provide a relationship between the process parameters of the powder bed fusion additive manufacturing process, thermodynamic and geometric characteristics of the single track melt pool, and/or thermo-physical properties of a material used in the of the powder bed fusion additive manufacturing process.

The process parameters of the powder bed fusion additive manufacturing process can include at least one of energy type, energy density, beam energy level, beam spot size, beam wavelength, beam tilt, beam scanning pattern, beam scanning speed, beam power distribution, type of the material, powder layer thickness, compaction density of material powder, powder particle size distribution, hatch spacing of an additive manufacturing machine used for the powder bed fusion additive manufacturing process, and/or an arrangement of a powder re-coater of the additive manufacturing machine.

The target thickness of the heat exchanger wall can include a thickness of equal to or less than 0.004 inches (0.010 centimeters).

A method of additively manufacturing a heat exchanger that can include a heat exchanger wall with a target thickness of desirably less than 0.005 inches (0.013 centimeters) can include using a model, the target thickness of the heat exchanger wall, and/or process parameters of a powder bed fusion additive manufacturing process to identify a set of process parameters to produce the heat exchanger wall with the target thickness. The model can relate the process parameters of the powder bed fusion additive manufacturing process to geometry of a single track melt pool created during the powder bed fusion additive manufacturing process, and can relate the single track melt pool geometry to a resulting thickness of the heat exchanger wall. The model can include at least one of analytical modeling, empirical modeling, finite element modeling, computational fluid dynamics based single phase flow modeling, and/or computational fluid dynamics based free surface modeling. At least one variable process parameter of the powder bed fusion additive manufacturing process can be defined as one of beam energy level, beam scanning speed, beam scanning pattern, and/or a layer thickness of the powder. The single track melt pool geometry can be predicted based on the model and/or process parameters that include at least one variable process parameter. The thickness of the heat exchanger wall can be predicted based on the single track melt pool geometry. The set of process parameters that will produce the heat exchanger wall with the target thickness can be identified by adjusting at least one variable process parameter. The powder bed fusion additive manufacturing process can be controlled based upon the identified set of process parameters to create, on a layer-by-layer basis, the heat exchanger wall with the target thickness.

The method of the preceding paragraph can optionally include, additionally and/or alternatively, any one or more of the following features, configurations and/or additional components.

The powder bed fusion additive manufacturing process can further comprise inputting the identified set of process parameters into an additive manufacturing machine used for the powder bed fusion additive manufacturing process.

An analysis can be used to experimental results of the powder bed fusion additive manufacturing process to calibrate the model.

The analysis can include at least one of finite element analysis, empirical analysis, stress analysis, regression analysis, sensitivity analysis, calibration of boundary convection coefficients of a melt pool created during the additive manufacturing process based on the model, predicting a thermo-capillary convection of the melt pool, and/or computation of deformation of the melt pool.

Creating the model can further comprise adapting the model based on results of the analysis of the experimental results, wherein the model can further provide a relationship between the process parameters of the powder bed fusion additive manufacturing process, thermo-dynamic and geometric characteristics of the single track melt pool, and/or thermo-physical properties of a material used in the of the powder bed fusion additive manufacturing process.

The process parameters of the powder bed fusion additive manufacturing process can include at least one of energy type, energy density, beam energy level, beam spot size, beam wavelength, beam tilt, beam scanning pattern, beam scanning speed, beam power distribution, type of the material, powder layer thickness, compaction density of material powder, powder particle size distribution, hatch spacing of an additive manufacturing machine used for the powder bed fusion additive manufacturing process, and/or an arrangement of a powder re-coater of the additive manufacturing machine.

Operating the powder bed fusion additive manufacturing process can further comprise forming the heat exchanger wall such that the heat exchanger wall can include a thickness of equal to or less than 0.004 inches (0.010 centimeters).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of producing a heat exchanger with an additive manufacturing machine using a powder bed fusion additive manufacturing process , the method comprising:
   designing the heat exchanger to include a wall with a target thickness of less than 0. 005 inches (0.013 centimeters);
   creating a model that relates process parameters of the powder bed fusion additive manufacturing process to geometry of a single track melt pool created during the powder bed fusion additive manufacturing process and relates the single track melt pool geometry to a resulting thickness of the heat exchanger wall, wherein the geometry of the single track melt pool includes at least one of a width, depth, and length of the single track melt pool, wherein the model comprises computational fluid dynamics based free surface modeling, and wherein creating the model comprises:
      defining at least one variable process parameter of the powder bed fusion additive manufacturing process, wherein the at least one variable process parameter of the powder bed fusion additive manufacturing process is one of beam energy level, beam scanning speed, beam scanning pattern, and a layer thickness of the powder;
   calibrating, with the additive manufacturing machine, the model for free surface computational fluid dynamics with thermo-capillary convection with experimental results for the width and depth of the melt pool, wherein calibrating the model comprises:
      applying, with the additive manufacturing machine, an analysis to the experimental results of the powder bed fusion additive manufacturing process, wherein the analysis comprises:

stress analysis; and
calibration of boundary convection coefficients of the single track melt pool created during the additive manufacturing process based on the model;
using the model, the target thickness of the heat exchanger wall, and the at least one variable process parameter of the powder bed fusion additive manufacturing process to identify a set of the process parameters of the powder bed fusion additive manufacturing process to produce the heat exchanger wall with the target thickness, wherein using the model comprises:
predicting the single track melt pool geometry based on the model and the process parameters of the powder bed fusion additive manufacturing process that include the at least one variable process parameter;
predicting a change of the thickness of the heat exchanger wall based on the single track melt pool geometry and distortion of the heat exchanger wall;
predicting a thermo-capillary convection of the single track melt pool;
computing deformation of the single track melt pool; and
identifying the set of process parameters of the powder bed fusion additive manufacturing process that will produce the heat exchanger wall with the target thickness by adjusting the at least one variable process parameter; and
controlling, with the additive manufacturing machine, the powder bed fusion additive manufacturing process based upon the identified set of process parameters of the powder bed fusion additive manufacturing process to create with the additive manufacturing machine, on a layer-by-layer basis, the heat exchanger wall with the target thickness.

2. The method of claim 1, wherein controlling the powder bed fusion additive manufacturing process comprises:
inputting the identified set of process parameters into the additive manufacturing machine used for the powder bed fusion additive manufacturing process.

3. The method of claim 1, further comprising:
creating the model based on results of the analysis of the experimental results, wherein the model further provides a relationship between the process parameters of the powder bed fusion additive manufacturing process, thermal and geometric characteristics of the single track melt pool, and thermo-physical properties of a material used in the powder bed fusion additive manufacturing process.

4. The method of claim 3, wherein the process parameters of the powder bed fusion additive manufacturing process include at least one of energy type, energy density, beam energy level, beam spot size, beam wavelength, beam tilt, beam scanning pattern, beam scanning speed, beam power distribution, type of the material, powder layer thickness, compaction density of material powder, powder particle size distribution, hatch spacing of an additive manufacturing machine used for the powder bed fusion additive manufacturing process, and an arrangement of a powder re-coater of the additive manufacturing machine.

5. The method of claim 1, wherein the target thickness of the heat exchanger wall includes a thickness of equal to or less than 0.004 inches (0.010 centimeters).

6. A method of additively manufacturing a heat exchanger with an additive manufacturing machine, the heat exchanger including a heat exchanger wall with a target thickness of less than 0.005 inches (0.013 centimeters), the method comprising:
calibrating, with the additive manufacturing machine, a model for free surface computational fluid dynamics with thermo-capillary convection with experimental results for a width and a depth of a melt pool, wherein calibrating the model comprises:
applying an analysis to the experimental results of a powder bed fusion additive manufacturing process, wherein the analysis comprises:
stress analysis; and
calibration of boundary convection coefficients of a single track melt pool created during the additive manufacturing process based on the model;
using the model, the target thickness of the heat exchanger wall, and process parameters of a powder bed fusion additive manufacturing process to identify a set of the process parameters of the powder bed fusion additive manufacturing process to produce the heat exchanger wall with the target thickness, wherein the model relates the process parameters of the powder bed fusion additive manufacturing process to geometry of a single track melt pool created during the powder bed fusion additive manufacturing process and relates the single track melt pool geometry to a resulting thickness of the heat exchanger wall, wherein the model includes at least one of analytical modeling, empirical modeling, finite element modeling, computational fluid dynamics based single phase flow modeling, and computational fluid dynamics based free surface modeling, and wherein using the model comprises:
defining at least one variable process parameter of the powder bed fusion additive manufacturing process, wherein the at least one variable process parameter of the powder bed fusion additive manufacturing process is one of beam energy level, beam scanning speed, beam scanning pattern, and a layer thickness of the powder;
predicting the single track melt pool geometry based on the model and the process parameters of the powder bed fusion additive manufacturing process that include the at least one variable process parameter;
predicting a change of the thickness of the heat exchanger wall based on the single track melt pool geometry and distortion of the heat exchanger wall;
predicting a thermo-capillary convection of the single track melt pool;
computing deformation of the single track melt pool; and
identifying the set of process parameters of the powder bed fusion additive manufacturing process that will produce the heat exchanger wall with the target thickness by adjusting the at least one variable process parameter of the powder bed fusion additive manufacturing process; and
controlling, with the additive manufacturing machine, the powder bed fusion additive manufacturing process based upon the identified set of process parameters of the powder bed fusion additive manufacturing process to create with the additive manufacturing machine, on a layer-by-layer basis, the heat exchanger wall with the target thickness.

7. The method of claim 6, wherein controlling the powder bed fusion additive manufacturing process comprises:

inputting the identified set of process parameters into an additive manufacturing machine used for the powder bed fusion additive manufacturing process.

8. The method of claim 6, wherein calibrating the model comprises:
adapting the model based on results of the analysis of the experimental results, wherein the model further provides a relationship between the process parameters of the powder bed fusion additive manufacturing process, thermo-dynamic and geometric characteristics of the single track melt pool, and thermo-physical properties of a material used in the of the powder bed fusion additive manufacturing process.

9. The method of claim 6, wherein the process parameters of the powder bed fusion additive manufacturing process include at least one of energy type, energy density, beam energy level, beam spot size, beam wavelength, beam tilt, beam scanning pattern, beam scanning speed, beam power distribution, type of the material, powder layer thickness, compaction density of material powder, powder particle size distribution, hatch spacing of an additive manufacturing machine used for the powder bed fusion additive manufacturing process, and an arrangement of a powder re-coater of the additive manufacturing machine.

10. The method of claim 6, wherein additively manufacturing the heat exchanger further comprises:
forming the heat exchanger wall such that the heat exchanger wall includes a thickness of equal to or less than 0.004 inches (0.010 centimeters).

* * * * *

UNITED STATES PATENT AND TRADEMARK OFFICE
CERTIFICATE OF CORRECTION

PATENT NO. : 10,372,110 B2
APPLICATION NO. : 15/185262
DATED : August 6, 2019
INVENTOR(S) : Vijay Jagdale et al.

Page 1 of 1

It is certified that error appears in the above-identified patent and that said Letters Patent is hereby corrected as shown below:

In the Specification

Column 3, Line 4:
Delete "model an"
Insert --model of an--

Column 3, Line 31:
Delete "thereto"
Insert --thermo--

Column 3, Line 42:
Delete "thereto"
Insert --thermo--

Column 5, Line 29:
Delete "thereto"
Insert --thermo--

Signed and Sealed this
Seventeenth Day of September, 2019

Andrei Iancu
*Director of the United States Patent and Trademark Office*